United States Patent
Chiarella et al.

(10) Patent No.: US 10,901,081 B2
(45) Date of Patent: Jan. 26, 2021

(54) VIRTUAL REALITY SAFETY

(71) Applicant: International Business Machines Corporation, Armonk, NY (US)

(72) Inventors: Giacomo G. Chiarella, Eastleigh (GB); Simon Clark, Eastleigh (GB); Katherine Rose Farmer, Basingstoke (GB)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 16/149,187

(22) Filed: Oct. 2, 2018

(65) Prior Publication Data

US 2020/0103521 A1 Apr. 2, 2020

(51) Int. Cl.
| | | |
|---|---|---|
| G01S 13/93 | (2020.01) | |
| G06T 19/00 | (2011.01) | |
| G06F 3/01 | (2006.01) | |
| G06F 9/54 | (2006.01) | |
| H04W 4/80 | (2018.01) | |
| H04W 4/02 | (2018.01) | |
| A63F 13/49 | (2014.01) | |
| H04W 4/33 | (2018.01) | |

(52) U.S. Cl.
CPC .............. *G01S 13/93* (2013.01); *A63F 13/49* (2014.09); *G06F 3/011* (2013.01); *G06F 9/542* (2013.01); *G06T 19/006* (2013.01); *H04W 4/027* (2013.01); *H04W 4/80* (2018.02); *H04W 4/33* (2018.02)

(58) Field of Classification Search
None
See application file for complete search history.

(56) References Cited

U.S. PATENT DOCUMENTS

| | | | | |
|---|---|---|---|---|
| 9,690,367 | B2* | 6/2017 | Pedrotti | ............... G02B 27/017 |
| 9,779,605 | B1* | 10/2017 | Taylor | ..................... G01S 13/42 |
| 9,851,786 | B2* | 12/2017 | Pedrotti | ................... G06F 3/014 |
| 10,416,837 | B2* | 9/2019 | Reif | ........................ G06F 3/011 |
| 10,535,199 | B1* | 1/2020 | Bond | ...................... G06T 15/08 |

(Continued)

FOREIGN PATENT DOCUMENTS

| | | |
|---|---|---|
| WO | 2013052855 A2 | 4/2013 |
| WO | 2016014877 A1 | 1/2016 |

(Continued)

OTHER PUBLICATIONS

Anonymous, "Virtual Reality headset with sensor for collision detection", An IP.com Prior Art Database Technical Disclosure, IP.com No. IPCOM000247326D, IP.com Electronic Publication Date: Aug. 24, 2016, 5 pages.

(Continued)

*Primary Examiner* — James A Thompson
(74) *Attorney, Agent, or Firm* — James L. Olsen (57) ABSTRACT

Aspects of the present disclosure relate to enhancing virtual reality safety. A virtual reality (VR) boundary associated with a VR system can be determined, the VR boundary dictating a safe play area for a VR user using the VR system. A location of a first device can be determined. A determination can be made that the location of the first device is within the VR boundary. In response to a determination that the first device is within the VR boundary, the VR user can be alerted that the first device entered the VR boundary.

19 Claims, 7 Drawing Sheets

(56) References Cited

U.S. PATENT DOCUMENTS

| | | | |
|---|---|---|---|
| 2007/0173265 A1* | 7/2007 | Gum | G01S 5/0027 |
| | | | 455/456.1 |
| 2015/0024368 A1* | 1/2015 | King, Jr. | G09B 5/02 |
| | | | 434/365 |
| 2016/0124502 A1 | 5/2016 | Sawyer et al. | |
| 2016/0171770 A1* | 6/2016 | Pedrotti | G06F 3/012 |
| | | | 345/633 |
| 2016/0171771 A1* | 6/2016 | Pedrotti | G02B 27/017 |
| | | | 345/633 |
| 2017/0053440 A1 | 2/2017 | Yoon et al. | |
| 2018/0093186 A1* | 4/2018 | Black | A63F 13/211 |
| 2018/0373412 A1* | 12/2018 | Reif | G06F 3/04815 |
| 2019/0043259 A1* | 2/2019 | Wang | H04N 13/25 |
| 2019/0340909 A1* | 11/2019 | Nguyen | G08B 21/02 |
| 2020/0134895 A1* | 4/2020 | Pollard | G06F 3/016 |

FOREIGN PATENT DOCUMENTS

| | | |
|---|---|---|
| WO | 2017120917 A1 | 7/2017 |
| WO | 2017201191 A1 | 11/2017 |
| WO | 2018064081 A1 | 4/2018 |

OTHER PUBLICATIONS

Mell et al., "The NIST Definition of Cloud Computing", Recommendations of the National Institute of Standards and Technology, Sep. 2011, 7 pages.

\* cited by examiner

VIRTUAL REALITY SAFETY

BACKGROUND

The present disclosure relates generally to the field of virtual reality, and in particular to virtual reality safety.

Virtual Reality (VR) systems simulate virtual environments using computer technology. VR systems provide sensory data (e.g., audio and visual data) to users such that the users experience an immersive environment. VR systems typically include a head-mounted display (HMD) which a user can wear to visualize a simulated environment. The simulated environment can be similar to the real world or entirely fictional.

SUMMARY

Embodiments of the present disclosure relate to a method, system, and computer program product for enhancing virtual reality safety. A virtual reality (VR) boundary associated with a VR system can be determined, the VR boundary dictating a safe play area for a VR user using the VR system. A location of a first device can be determined. A determination can then be made whether the location of the first device is within the VR boundary. In response to a determination that the first device is within the VR boundary, the VR user can be alerted that the first device entered the VR boundary.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of virtual reality, and in particular to virtual reality safety. While the present disclosure is not necessarily limited to such applications, various aspects of the disclosure can be appreciated through a discussion of various examples using this context.

Virtual Reality (VR) systems simulate virtual environments using computer technology. VR systems commonly include a head mounted display (HMD) which provides, among other data, visual sensory data to a user wearing the HMD. Because VR systems obstruct users' vision of the real world (the virtual display completely overlays reality), users can be unaware of individuals and/or objects in the real world. This raises various safety concerns. For example, a user wearing a VR HMD could collide with people and/or objects in the real world. In certain VR games (e.g., combat-based games) movements can be rapid and are often unexpected by users in the real world (herein referred to as "non-users"). This has the potential to cause damage to both individuals involved (e.g., the VR user and the non-user).

Aspects of the present disclosure relate to enhancing the safety of a VR environment by tracking the location of devices in the vicinity of the VR environment. The location of nearby devices (e.g., devices possessed by users and/or autonomous mobile devices) can be determined and compared to a VR boundary of a VR system. If a determination is made that a device is within the VR boundary, one or more alert actions can be issued to a user currently immersed in VR (e.g., a VR user).

Figure 1:
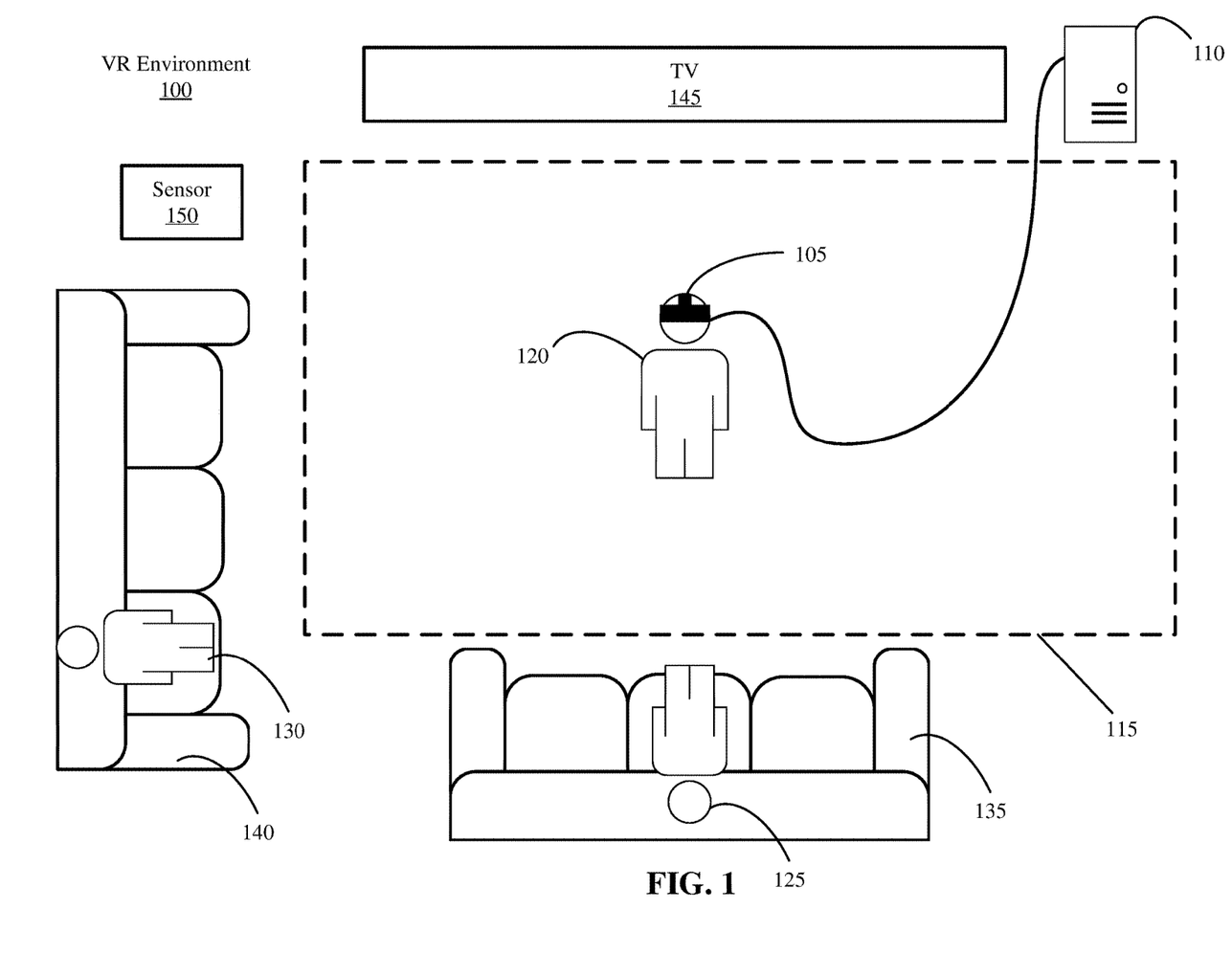
FIG. 1 depicts a VR environment in which illustrative embodiments of the present disclosure can be implemented.

Referring now to the figures, FIG. 1 is a diagram illustrating an example virtual reality (VR) environment 100, in accordance with embodiments of the present disclosure. The virtual reality environment 100 includes a VR head-mounted display (HMD) 105 communicatively coupled to a computer system 110. A VR user 120 is actively using the VR HMD 105 while a first and second non-user 125 and 130 (e.g., collectively "non-users 125 and 130") are spectating from a first and second couch 135 and 140 (collectively "couches 135 and 140), respectively.

Prior to using the VR HMD 105, the VR user 120 can set up the VR environment 100. Initially, the VR user 120 can install required VR software on the computer system 110 and configure communicative coupling between the computer system 110, the VR HMD 105, and a sensor 150. Upon initiation of the VR software on the computer system 110, the VR user 120 can be prompted for a room set-up. The room set-up can ensure that the VR HMD is properly calibrated based on the VR user 120 (e.g., a proper height and viewing direction) and that the VR user 120 does not collide with nearby objects. The room set-up can include indicating the location of the ground, the height of the user, and the direction the user will be oriented during VR use. Further, the room set-up can include defining a VR boundary 115. The VR boundary 115 can be defined to ensure that the VR user 120 will not collide with stationary objects in the room. This is completed by displaying the VR boundary 115 to the VR user 120 while using the VR HMD 105 such that the user remains within the VR boundary 115 and does not collide with objects, such as the couches 135 and 140 or a television 145. In embodiments, the VR boundary 115 can only be displayed (during VR gameplay) while the user is moving (e.g., to minimize clutter when immersed in the VR environment).

After configuring the VR environment 100, the VR user 120 can wear the VR HMD 105 and initiate VR use. The sensor 150 can be configured to track the VR user 120 when immersed in VR. For example, the sensor 150 can track the VR HMD 105 and controllers (not shown) to provide an immersive VR experience. The sensor 150 can use utilize the tracking of the VR HMD 105 and/or controllers to determine the VR user's position with respect to the VR boundary 115. This can be used to alert the VR user 120 if he or she is approaching the VR boundary 115 in order to prevent collision with the TV 145, computer system 110, couches 135 and 140, and/or sensor 150 during VR use.

Though the VR HMD 105 can be configured to provide safety to the VR user 120 in a static environment (e.g., when the VR user 120 is the only moving entity within the VR boundary 115), the VR HMD 105 may not be configured to provide safety when other entities, such as the non-users 125 and 130, are moving within the VR boundary 115. For example, though the VR user 120 can be notified of the VR boundary 115 position to avoid collision with objects outside of the VR boundary 115, the VR user 120 may not be aware of non-users 125 and 130 moving within the VR boundary 115. This can lead to the VR user 120 colliding with non-users which can cause injury.

Aspects of the present disclosure enhance safety and improve usability of the VR environment 100 by monitoring (e.g., tracking) devices which enter and leave the VR boundary 115. For example, the computer system 110 can be configured to monitor devices associated with the non-users 125, 130. The computer system 110 can then notify the VR user 120 when the devices enter the VR boundary 115. This can prevent collision between non-users in possession of mobile devices (e.g., tablets, smart phones, wearables, etc.) and the VR user 120. Further, this can prevent collision between autonomous mobile devices (e.g., mobile vacuums, drones, etc.) and the VR user 120.

It is noted that FIG. 1 is intended to depict the representative major components of an example VR environment 100. In some embodiments, however, individual components can have greater or lesser complexity than as represented in FIG. 1, components other than or in addition to those shown in FIG. 1 can be present, and the number, type, and configuration of such components can vary. Thus, the configuration of the system can vary, and aspects of the present disclosure are not limited to any particular arrangement described. For example, in embodiments, the VR environment 100 can include multiple (e.g., two or more) similar or dissimilar sensors 150. The multiple sensors can be each be used for tracking nearby devices and/or the VR HMD 105.

Figure 2:
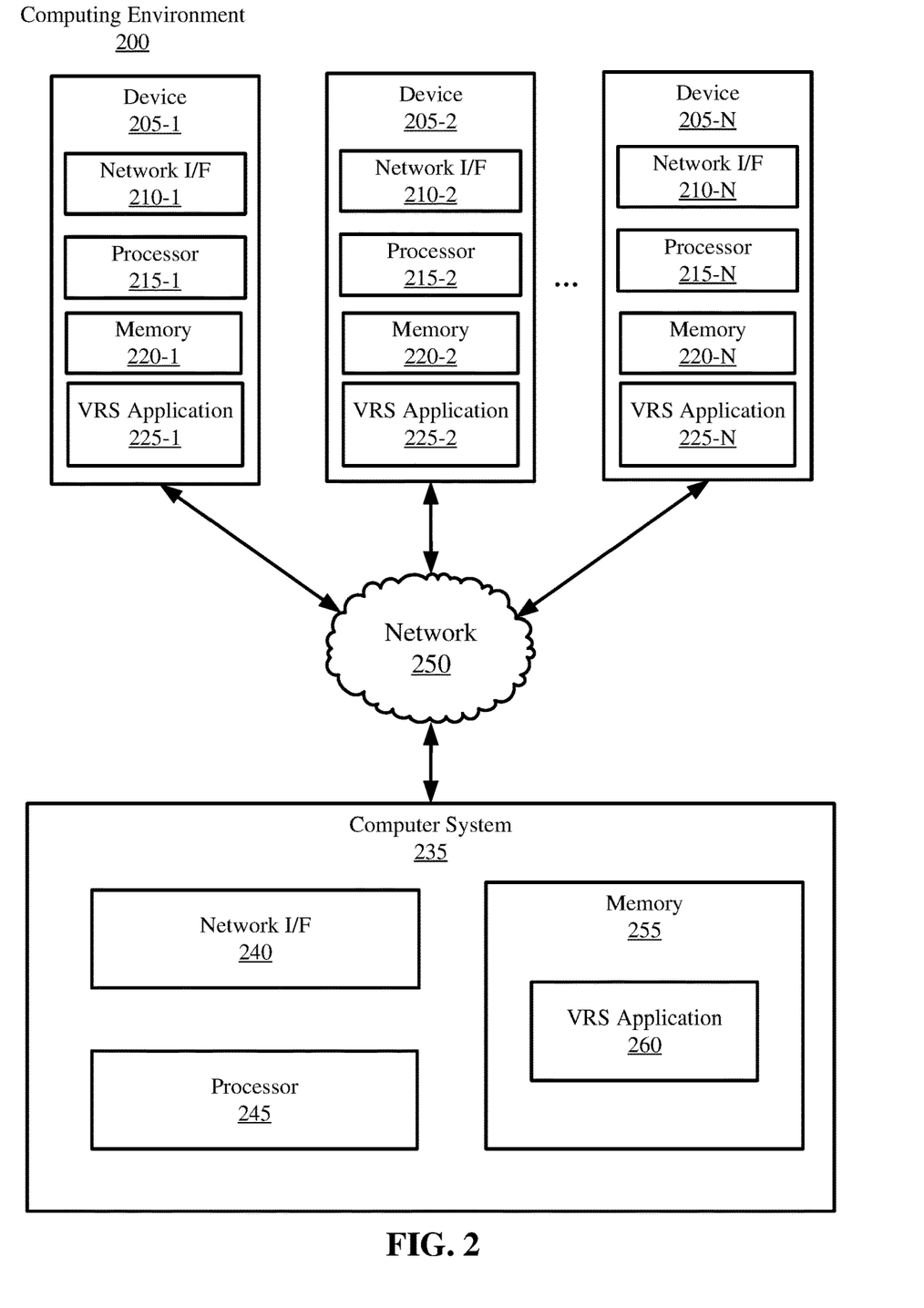
FIG. 2 depicts a block diagram of an example computing environment in which illustrative embodiments of the present disclosure can be implemented.

Turning now to FIG. 2, shown is a block diagram illustrating an example computing environment 200 in which illustrative embodiments of the present disclosure can be implemented. Computing environment 200 includes a plurality of devices 205-1, 205-2 . . . 205-N (collectively referred to as devices 205), at least one computer system 235, and a network 250.

The devices 205 and the computer system 235 include one or more processors 215-1, 215-2 . . . 215-N (collectively referred to as processors 215) and 245 and one or more memories 220-1, 220-2 . . . 220-N (collectively referred to as memories 220) and 255, respectively. The devices 205 and the computer system 235 are configured to communicate with each other through internal or external network interfaces 210-1, 210-2 . . . 210-N (collectively referred to as network interfaces 210) and 240. The network interfaces 210 and 240 are, in some embodiments, modems or network interface cards. The devices 205 and/or the computer system 235 can be equipped with a display or monitor. Additionally, the devices 205 and/or the computer system 235 include optional input devices (e.g., a keyboard, mouse, scanner, video camera, or other input device, controllers, VR HMDs, sensors, etc.), and/or any commercially available or custom software (e.g., browser software, communications software, server software, natural language processing software, search engine and/or web crawling software, VR software, etc.). The devices 205 and/or the computer system 235 can be servers, desktops (e.g., a VR-ready machine), laptops, autonomous mobile devices (e.g., a mobile vacuum cleaner), sensors (e.g., optical sensors), or hand-held devices (e.g., smart phones, wearables, or tablets associated with users).

The devices 205 and the computer system 235 can be distant from each other and communicate over the network 250. In some embodiments, the computer system 235 can be a central hub from which devices 205 can establish a communication connection, such as in a client-server networking model. Alternatively, the computer system 235 and devices 205 can be configured in any other suitable networking relationship (e.g., in a peer-to-peer (P2P) configuration or using any other network topology).

The network 250 can be implemented using any number of any suitable communications media. For example, the network 250 can be a wide area network (WAN), a local area network (LAN), an Internet, or an intranet. In certain embodiments, the devices 205 and the computer system 235 can be local to each other and communicate via any appropriate local communication medium. For example, the devices 205 and the computer system 235 can communicate using a local area network (LAN), one or more hardwire connections, a wireless link (e.g., Bluetooth®) or router, or an intranet. In some embodiments, the devices 205 and the computer system 235 can be communicatively coupled using a combination of one or more networks and/or one or more local connections. For example, the first device 205-1 (e.g., a VR HMD) can be hardwired to the computer system 235 (e.g., connected with an Ethernet cable) while the second device 205-2 (e.g., an optical sensor) can communicate with the computer system 235 using a wireless link, such as Bluetooth.

In some embodiments, the network 250 is implemented within a cloud computing environment or using one or more cloud computing services. Consistent with various embodiments, a cloud computing environment can include a network-based, distributed-data processing system that provides one or more cloud computing services. Further, a cloud computing environment can include many computers (e.g., hundreds or thousands of computers or more) disposed within one or more data centers and configured to share resources over the network 250.

The devices 205 and computer system 235 include a Virtual Reality Safety (VRS) application 225, 260. The VRS application 225, 260 can be configured to alert a user wearing a VR HMD (e.g., VR HMD 105 of FIG. 1) when a device enters a VR boundary (e.g., VR boundary 115 of FIG. 1). The VRS application 225, 260 can be configured to determine the location of devices in the vicinity of the VR environment (e.g., VR environment 100 of FIG. 1). The VRS application 225, 260 can also be configured to collect/determine the VR boundary location (e.g., from VR software located on the computer system 235 and/or devices 205). For example, the VRS application 225, 260 can access the VR boundary (e.g., VR perimeter) which was configured by a user during a room set-up. The VRS application can then compare the location of devices in the vicinity of the VR environment to the VR boundary to determine whether a device enters the VR boundary. If a determination is made that a device enters the VR boundary, then one or more alert actions can be issued. Alert actions include, but are not limited to, audio notifications, visual notifications, and haptic feedback.

While FIG. 2 illustrates a computing environment 200 with a single computer system 235, suitable computing environments for implementing embodiments of this disclosure can include any number of computer systems. The various models, modules, systems, and components illustrated in FIG. 2 can exist, if at all, across a plurality of computer systems and devices. For example, some embodiments can include two computer systems. The two computer systems can be communicatively coupled using any suitable communications connection (e.g., using a WAN, a LAN, a wired connection, an intranet, or the Internet).

It is noted that FIG. 2 is intended to depict the representative major components of an example computing environment 200. In some embodiments, however, individual components can have greater or lesser complexity than as represented in FIG. 2, components other than or in addition to those shown in FIG. 2 can be present, and the number, type, and configuration of such components can vary. Thus, the configuration of the system can vary, and aspects of the present disclosure are not limited to any particular arrangement described.

Figure 3:
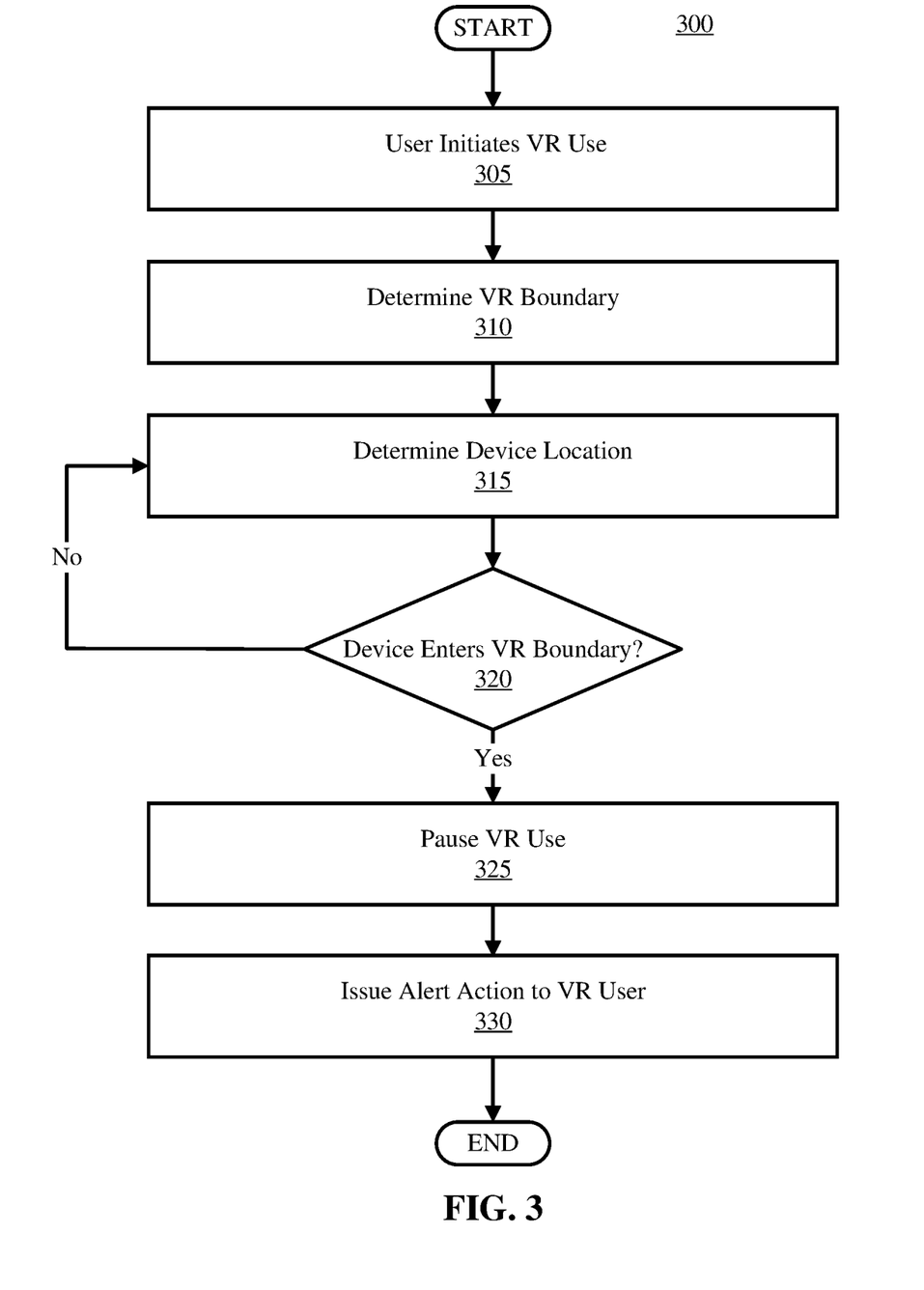
FIG. 3 is a flow diagram illustrating an example method for enhancing virtual reality safety, in accordance with embodiments of the present disclosure.

FIG. 3 is a flow-diagram illustrating an example method 300 for enhancing safety of a VR environment, in accordance with embodiments of the present disclosure. Method 300 initiates at operation 305, where a user (e.g., VR user 120 of FIG. 1) initiates VR use. The user can first power on a computer system (e.g., computer system 110 of FIG. 1 or computer system 235 of FIG. 2) communicatively coupled to a VR HMD (e.g., VR HMD 105 of FIG. 1). The user can ensure all VR equipment (e.g., controllers, optical sensors, base stations, etc.) is properly connected to the computer system. The user can then initiate VR software on the computer system and equip (e.g., wear) the VR HMD to begin VR usage.

A VR boundary is then determined (e.g., by VRS application 225, 260). This is illustrated at operation 310. The VR boundary can initially be set by a user, for example, during a room-set up protocol initiated by VR software. During the room-set up protocol, the user can "trace" the outline of the VR boundary using a controller, the VR HMD, or another device. The VR boundary can then be defined based on the outline traced by the user. In some embodiments, the VR boundary is slightly modified (e.g., "cleaned up") based on the user's original trace, to straighten the boundary lines. The VR boundary can then be accessed from the VR software from the VRS application. In some embodiments, the VRS application can be used to configure the VR boundary. For example, the VRS application can prompt the user to create a custom VR boundary (e.g., using an input device (e.g., a mouse), a touch gesture, a voice command, etc.).

The location of a device is determined. This is illustrated at operation 315. The location of devices in the vicinity of the VR environment are determined to determine whether any devices are within the VR boundary and thus a safety concern. The location of nearby devices can be determined in any suitable manner. For example, the location of nearby devices can be determined using an indoor positioning system (IPS).

In some embodiments, the location of a device is determined using wireless technology. These wireless technologies include, but are not limited to, Wi-Fi, Bluetooth Low Energy (BLE), Radio-frequency Identification (RFID), and Ultra-wideband (UWB). Signals (e.g., the speed, strength, and/or angle of signals) traveling between transmitters (e.g., a sensor) and receivers (e.g., a mobile device) can be used to approximate location. For example, Time of Flight (TOA), Received Signal Strength Indicator (RSSI), and/or Angle of Arrival (AOA) can be used to approximate the position of a device communicating with one or more receivers/transmitters.

In some embodiments, trilateration can be used to approximate the position of a device by measuring the time difference of arrival (TDOA) of wireless signals between the device (e.g., a smart watch) and three other devices (e.g., two VR sensors and a VR HMD headset). In some embodiments, RSSI measurements can be used to approximate the position of a device. This can be completed by measuring the RSSI of a particular device from periodic broadcast signals (e.g., a Wi-Fi access point). Based on the transmitted power of the signal source and the measured RSSI value, the propagation loss of the signal can be determined. A propagation loss model can then be used to infer the distance between the device and the signal source.

In some embodiments, the location of a device is determined using visible light communication (VLC). In these embodiments, light from light sources (e.g., light emitting diodes (LEDS), lamps, etc.) can be measured by a photosensor to determine the distance between the photosensor and the light sources. In some embodiments, global positioning system (GPS) technology can be used to determine the approximate location of a device.

In embodiments, the position of the device can be tracked in real-time. In these embodiments, the position of the device can be dynamically updated (e.g., by sampling the position periodically). In some embodiments, tracking technologies such as accelerometers, inertial sensors, and/or gyroscopes can be used to aid in tracking the device.

A combination of IPS technologies can be used to determine the position of devices in the VR environment. For example, VLC positioning can be coupled with RSSI based positioning to determine the position of a device. As another example, GPS positioning can be coupled with BLE trilateration positioning. However, any suitable IPS can be implemented to locate/track the position of devices in the vicinity of the VR environment.

A determination is then made whether a device is within (e.g., enters) the VR boundary. This is illustrated at operation 320. This is completed by comparing the position of the device determined at operation 315 to the VR boundary perimeter obtained at operation 310. If the position of the device is within (e.g., or on the perimeter of) the VR boundary, a determination can be made that the device entered the VR boundary.

If a determination is made that the device does not enter the VR boundary, then process 300 returns to step 315, where the position of a device is determined. Devices in the vicinity of the VR environment can be continually tracked (e.g., periodically) to ensure that a VR user can be alerted if any devices enter the VR boundary.

If a determination is made that the device enters the VR boundary, then the VR use is paused. This is illustrated at operation 325. The VR use can be temporarily paused to prevent the VR user from making any drastic movements while the device is within the VR boundary. This can prevent the VR user from colliding with a non-user entering the VR boundary with the device. In some embodiments, the VRS application can access VR software associated with a VR HMD to pause the VR gameplay.

An alert action is then issued to the VR user. This is illustrated at operation 330. The alert action is issued to notify the VR user of the device which entered the VR boundary. Alert actions include, but are not limited to, audio, visual and/or haptic feedback. In some embodiments, pausing the VR use at operation 325 is the alert action. In some embodiments, the alert action includes an audio notification. For example, the audio notification can be an alarm having a particular pitch, tone, frequency and/or amplitude such that the VR user is quickly notified of the potential threat. In some embodiments, the audio notification can include speech (e.g., "Warning"). In some embodiments, the alert action includes visual feedback. The visual feedback can include altering the display of the VR HMD. For example, the visual feedback can include text (e.g., "Warning"), symbols (e.g., "!!!"), images, etc. displayed on the display of the VR HMD. In some embodiments, the alert action can include touch sensory (e.g., haptic) feedback. The haptic feedback can include forces, vibrations, and/or motions exerted on the VR user. For example, if a device enters the VR boundary, the VR HMD, controllers, and/or other components physically coupled to (e.g., equipped by, held by, in physical contact with, etc.) the user can vibrate to indicate the potential threat.

In some embodiments, issuing an alert action can include overlaying an image on the VR display that indicates the location of the identified device within the VR boundary. For example, if a non-user with a mobile device enters the VR boundary during VR use, an image can be superimposed on the VR display that indicates the location of the device. This can be used to indicate the location of non-users without requiring the VR user to pause VR use.

In some embodiments, alert actions can also be issued to non-users. That is, visual, audio, and/or haptic feedback can be provided to non-users upon entering the VR boundary. This can be used to ensure both non-users and VR users are aware of potential danger.

The aforementioned operations can be completed in any order and are not limited to those described. Additionally, some, all, or none of the aforementioned operations can be completed, while still remaining within the spirit and scope of the present disclosure. For example, in some embodiments, operation 325 may not be completed, and an alert action can be issued without pausing VR use.

Figure 4:
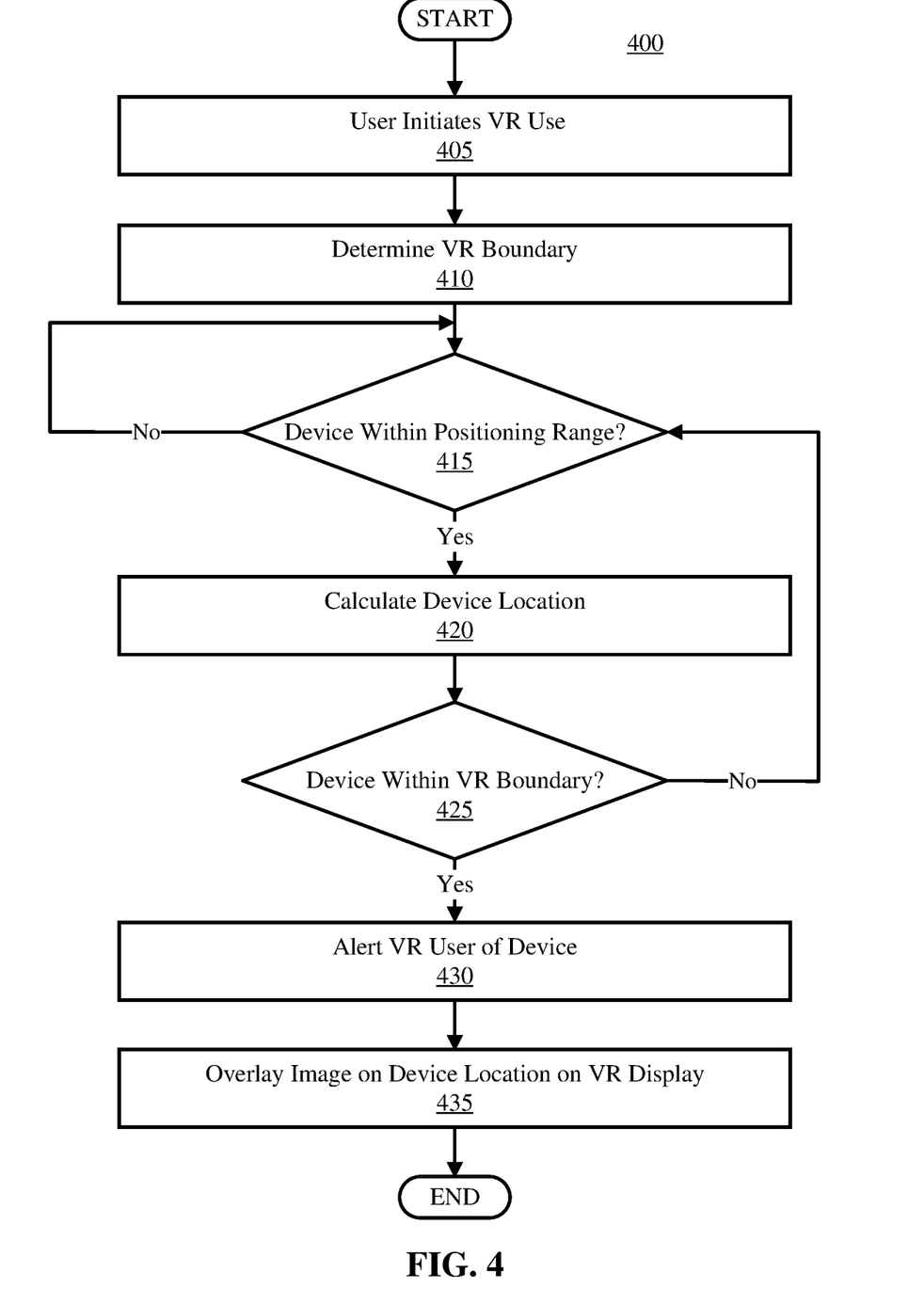
FIG. 4 is a flow diagram illustrating another example method for enhancing virtual reality safety, in accordance with embodiments of the present disclosure.

Turning now to FIG. 4, shown is a flow diagram illustrating an example method 400 for enhancing VR safety, in accordance with embodiments of the present disclosure. FIG. 4 initiates at operation 405, where a VR user initiates VR use. Initiating VR use at operation 405 can be the same as, or substantially similar to, initiating VR use at operation 305 of FIG. 3.

A VR boundary is then determined. This is illustrated at operation 410. In embodiments, the VR boundary is set by a user on a VRS application. In some embodiments, the VRS application obtains the VR boundary from VR software associated with a computer system. The VR boundary can be determined the same as, or substantially similar to, operation 310 of FIG. 3.

A determination is then made whether a device is within positioning range (e.g., sensing range, tracking range, etc.). This is illustrated at operation 415. In embodiments, determining whether a device is within positioning range can include determining whether the device can be located by an IPS. For example, if the IPS is a BLE trilateration system, determining whether the device is within positioning range can include determining whether the device can communicate with at least three Bluetooth enabled sensors within the VR environment. As another example, if the IPS includes VLC, then determining whether the device is within positioning range can include determining whether one or more photosensors are receiving light from light sources configured in the VR environment. However, determining whether a device is within positioning range can be completed in any other suitable manner, and can depend on the particular IPS technology. For example, if an IPS is based on RSSI, if the measured RSSI value for a particular device is too low (e.g., zero), a determination can be made that the device is not within positioning range If a determination is made that the device is not within positioning range, then method 400 resumes operation 415. In embodiments, operation 415 continuously occurs to identify any/all devices which enter the VR vicinity. Accordingly, if no devices are within positioning range, the method 400 can continuously monitor whether any devices enter positioning range.

If a determination is made that the device is within positioning range, the device position (e.g., location) is calculated. This is illustrated at operation 420. Calculating the device location can be completed the same as, or substantially similar to, determining the device location at operation 315 of FIG. 3. The device position is calculated based on the configured IPS. For example, trilateration (e.g., TODA) can be used to calculate a device position in an IPS with BLE technology. As another example, a propagation loss model can be used to calculate device position in an IPS based on RSSI values.

A determination is then made whether the device is within (e.g., enters) the VR boundary. This is illustrated at operation 425. Determining whether the device enters the VR boundary can be completed the same as, or substantially similar to, operation 320 of FIG. 3. The location of the device calculated at operation 420 is compared to the VR boundary determined at operation 410 in order to determine if the device is within (e.g., enters) the VR boundary.

If a determination is made that the device is not within the VR boundary, then method 400 returns to operation 415. The location of the device, though not in the VR boundary, can be continuously calculated as long as it is within positioning range to ensure that the device does not enter the VR boundary.

If a determination is made that the device is within the VR boundary, then the VR user is alerted. This is illustrated at operation 430. Alerting the VR user can be completed substantially similar to, or the same as, operation 330 of FIG. 3. For example, alerting can include issuing audio, visual, and/or haptic feedback. In some embodiments, alert actions can be specific to particular devices. For example, a first device can cause an audio alert upon entering the VR boundary while a second device can cause a visual alert upon entering the VR boundary. Alert options can be configurable by each VR user, such that each user can be alerted in the manner best suited for them. For example, if a particular user uses VR with low audio, the user can opt to only receive visual indications. Similarly, if a particular user prefers sound notifications, that user can opt to only receive audio alerts.

An image is then overlaid on the device location on the VR display. This is illustrated at operation 435. Overlaying an image on the device location on the VR display can be completed to alert the VR user of the approximate location of the device which entered the VR boundary. This can allow the user to continue VR use without pause/interruption. In embodiments, the location of the device with respect to the VR boundary can be determined, and the display of the VR HMD can be altered such that an image is displayed at the location of the device in the VR environment. For example, assume a non-user carrying a tablet enters the VR boundary. The location of the tablet is first determined within the VR boundary. An image (e.g., a symbol, character, figure, avatar, object, etc.) is then presented on the VR HMD display at the location of the tablet within the VR boundary such that the VR user can be aware of the location of the tablet while wearing the VR HMD.

In some embodiments, particular images can be presented based on particular devices. For example, device identifiers (e.g., MAC addresses, IP addresses, metadata, etc.) can be used to present particular images for particular devices. As an example, a device having a first device identifier can correspond to a sphere (e.g., a sphere is overlaid on the position of the device having the first device identifier on the VR HMD display) while a device having a second device identifier can correspond to a box (e.g., a box is overlaid on the position of the device having the second device identifier on the VR HMD display). In some embodiments, images can be manually selected for display for specific devices. For example, a first device can be designated to display a first avatar (e.g., a dragon) while a second device can be designated to display a second avatar (e.g., King Arthur).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
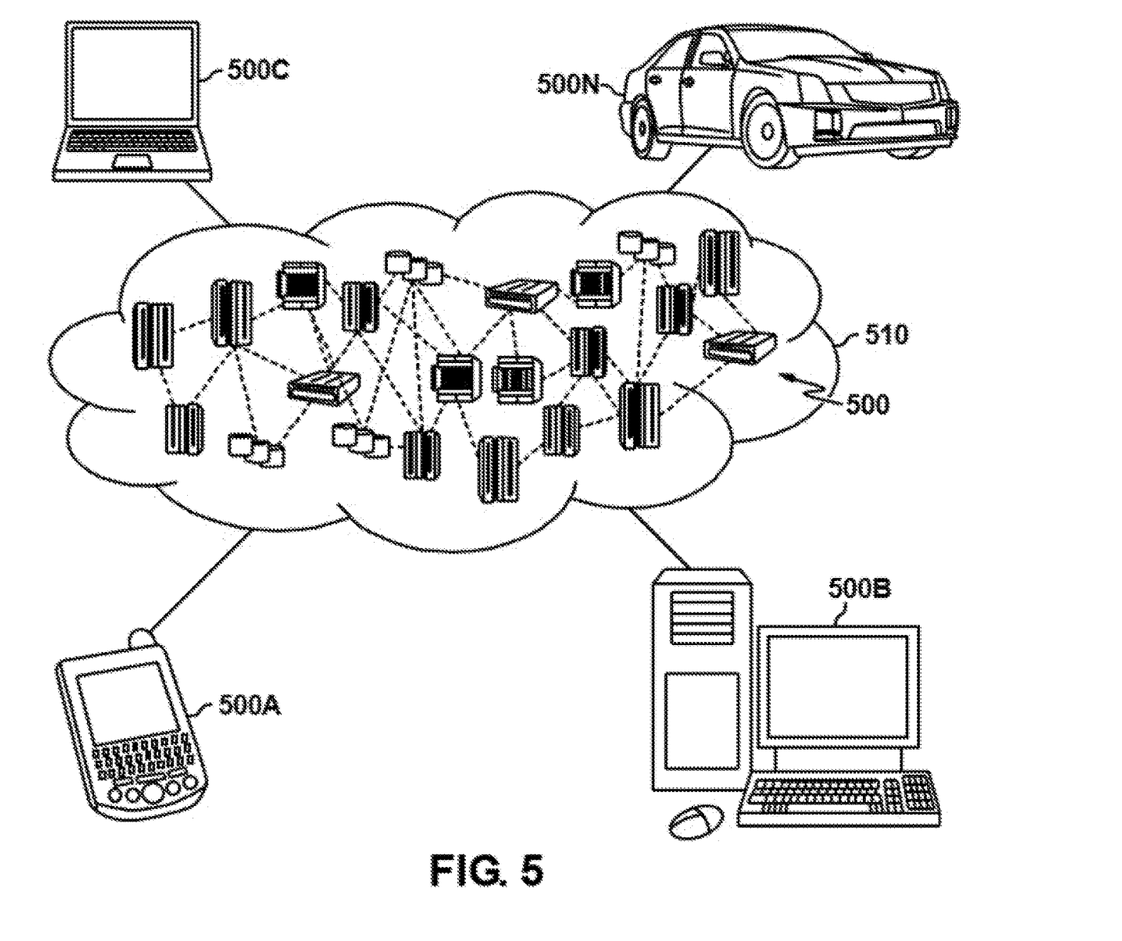
FIG. 5 is a diagram illustrating a cloud computing environment, in accordance with embodiments of the present disclosure.

Referring now to FIG. 5, illustrative cloud computing environment 510 is depicted. As shown, cloud computing environment 510 includes one or more cloud computing nodes 500 with which local computing devices used by cloud consumers, such as, for example, personal digital assistant (PDA) or cellular telephone 500A (e.g., devices 205), desktop computer 500B (e.g., computer system 110, devices 205, computer system 235) laptop computer 500C (e.g., computer system 110, devices 205, computer system 235), and/or automobile computer system 500N can communicate. Nodes 500 can communicate with one another. They can be grouped (not shown) physically or virtually, in one or more networks, such as Private, Community, Public, or Hybrid clouds as described hereinabove, or a combination thereof. This allows cloud computing environment 510 to offer infrastructure, platforms and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
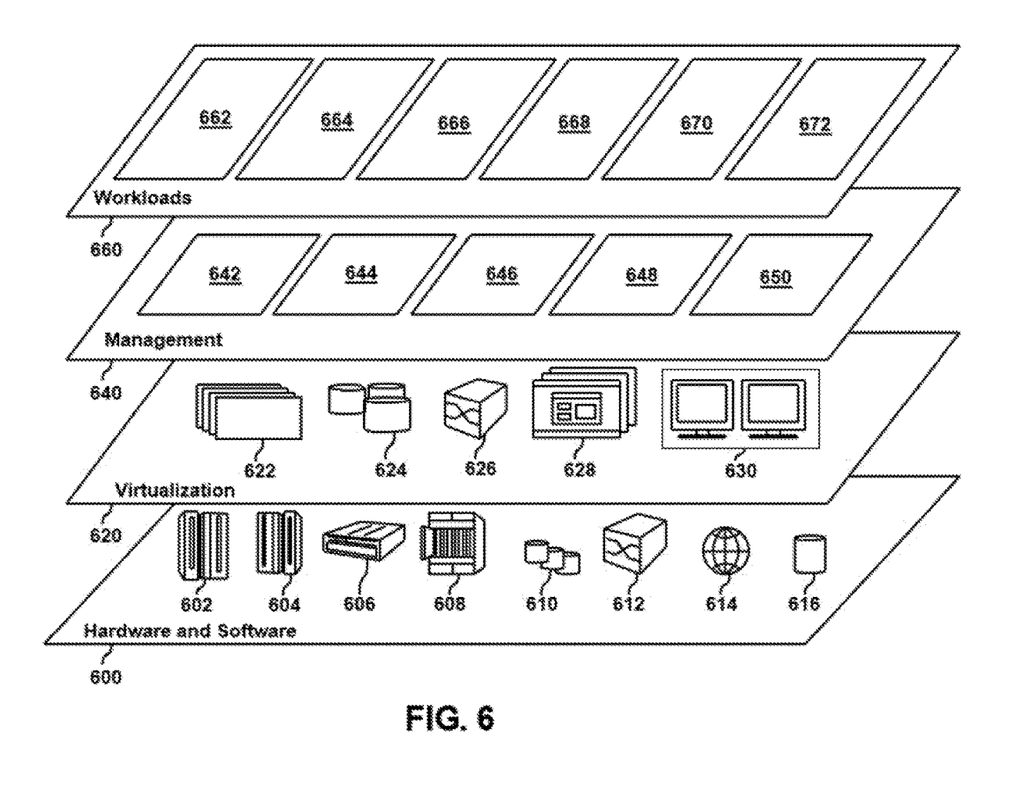
FIG. 6 is a block diagram illustrating abstraction model layers, in accordance with embodiments of the present disclosure.

Referring now to FIG. 6, a set of functional abstraction layers provided by cloud computing environment 510 (FIG. 5) is shown. It should be understood in advance that the components, layers, and functions shown in FIG. 6 are intended to be illustrative only and embodiments of the disclosure are not limited thereto. As depicted below, the following layers and corresponding functions are provided.

Hardware and software layer 600 includes hardware and software components. Examples of hardware components include: mainframes 602; RISC (Reduced Instruction Set Computer) architecture based servers 604; servers 606; blade servers 608; storage devices 610; and networks and networking components 612. In some embodiments, software components include network application server software 614 and database software 616.

Virtualization layer 620 provides an abstraction layer from which the following examples of virtual entities can be provided: virtual servers 622; virtual storage 624; virtual networks 626, including virtual private networks; virtual applications and operating systems 628; and virtual clients 630.

In one example, management layer 640 can provide the functions described below. Resource provisioning 642 provides dynamic procurement of computing resources and other resources that are utilized to perform tasks within the cloud computing environment. Metering and Pricing 644 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 646 provides access to the cloud computing environment for consumers and system administrators. Service level management 648 provides cloud computing resource allocation and management such that required service levels are met. Service level management 648 can allocate suitable processing power and memory to process static sensor data. Service Level Agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment can be utilized. Examples of workloads and functions which can be provided from this layer include: mapping and navigation 662; software development and lifecycle management 664; indoor positioning 666; data analytics processing 668; transaction processing 670; and virtual environment management 672.

Figure 7:
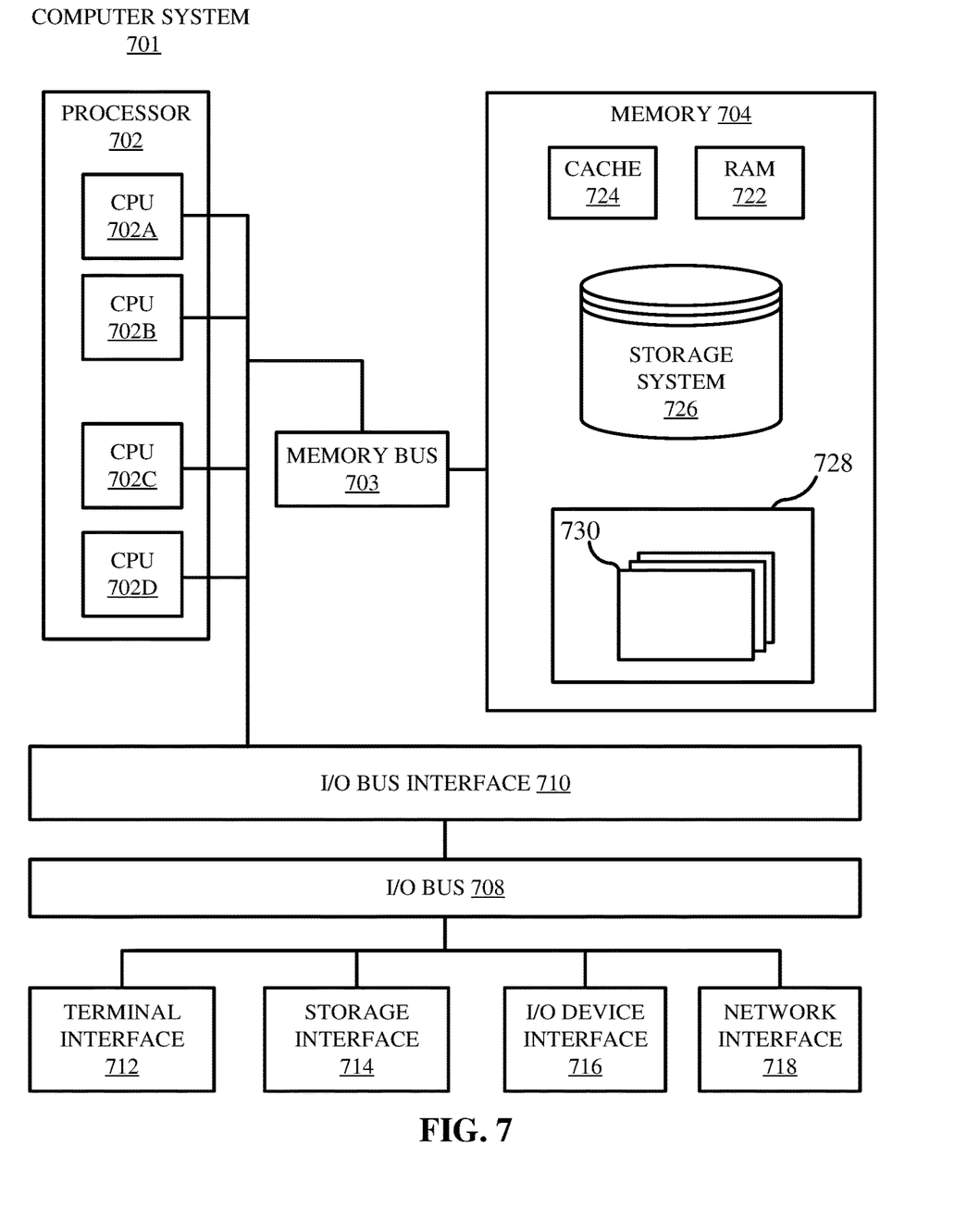
FIG. 7 is a high-level block diagram illustrating an example computer system that can be used in implementing one or more of the methods, tools, and modules, and any related functions, described herein, in accordance with embodiments of the present disclosure.

Referring now to FIG. 7, shown is a high-level block diagram of an example computer system 701 (e.g., computer system 110, devices 205, computer system 235) that can be used in implementing one or more of the methods, tools, and modules, and any related functions, described herein (e.g., using one or more processor circuits or computer processors of the computer), in accordance with embodiments of the present disclosure. In some embodiments, the major components of the computer system 701 can comprise one or more CPUs 702, a memory subsystem 704, a terminal interface 712, a storage interface 714, an I/O (Input/Output) device interface 716, and a network interface 718, all of which can be communicatively coupled, directly or indirectly, for inter-component communication via a memory bus 703, an I/O bus 708, and an I/O bus interface unit 710.

The computer system 701 can contain one or more general-purpose programmable central processing units (CPUs) 702A, 702B, 702C, and 702D, herein generically referred to as the CPU 702. In some embodiments, the computer system 701 can contain multiple processors typical of a relatively large system; however, in other embodiments the computer system 701 can alternatively be a single CPU system. Each CPU 702 can execute instructions stored in the memory subsystem 704 and can include one or more levels of on-board cache.

System memory 704 can include computer system readable media in the form of volatile memory, such as random access memory (RAM) 722 or cache memory 724. Computer system 701 can further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 can include at least one program product having a set (e.g., at least one) of program modules that are configured to carry out the functions of various embodiments.

One or more programs/utilities 728, each having at least one set of program modules 730 can be stored in memory 704. The programs/utilities 728 can include a hypervisor (also referred to as a virtual machine monitor), one or more operating systems, one or more application programs, other program modules, and program data. Each of the operating systems, one or more application programs, other program modules, and program data or some combination thereof, can include an implementation of a networking environment. Programs 728 and/or program modules 730 generally perform the functions or methodologies of various embodiments.

In some embodiments, the program modules 730 of the computer system 701 can include a virtual reality safety (VRS) module. The VRS module can be configured to obtain VR data, such as a VR boundary, from VR software. Further, the VRS module can be configured to determine the location of nearby devices (e.g., using indoor positioning techniques, such as BLE trilateration). The VRS module can further be configured to determine whether a device enters the VR boundary. If a determination is made that a device entered the VR boundary, the VRS module can be configured to pause VR use and/or issue one or more alert actions to a VR user immersed in VR.

Although the memory bus 703 is shown in FIG. 7 as a single bus structure providing a direct communication path among the CPUs 702, the memory subsystem 704, and the I/O bus interface 710, the memory bus 703 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 can, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices can be connected directly to one or more system I/O buses.

In some embodiments, the computer system 701 can be a multi-user mainframe computer system, a single-user system, or a server computer or similar device that has little or no direct user interface, but receives requests from other computer systems (clients). Further, in some embodiments, the computer system 701 can be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components can have greater or lesser complexity than as represented in FIG. 7, components other than or in addition to those shown in FIG. 7 can be present, and the number, type, and configuration of such components can vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   determining a virtual reality (VR) boundary associated with a VR system, the VR boundary being a perimeter set at a fixed location defining a safe play area for a VR user using the VR system based on surrounding objects outside of the VR boundary;
   determining, in response to determining the VR boundary, a location of a first device using an indoor positioning system;
   determining that the location of the first device has entered the VR boundary while the VR user wearing a VR head-mounted display (HMD) of the VR system is currently viewing VR content output on the VR HMD;
   alerting, in response to determining that the location of the first device has entered the VR boundary, the VR user by displaying an indication that the first device entered the VR boundary on the VR HMD;
   alerting, in response to determining that the location of the first device has entered the VR boundary, a non-user associated with the first device by displaying an indication that the first device entered the VR boundary on the first device; and
   overlaying a first image on the location of the first device on a display of the VR HMD, the first image assigned to the first device using a first device identifier.

2. The method of claim 1, wherein the location is determined via time difference of arrival (TDOA) trilateration.

3. The method of claim 1, further comprising:
   determining, prior to determining the location of the first device, that the first device is within positioning range; and calculating, in response to determining that the first device is within positioning range, the location of the first device.

4. The method of claim 1, further comprising:
pausing, prior to alerting the VR user that the first device entered the VR boundary, use of the VR system in response to determining that the location of the first device is within the VR boundary.

5. The method of claim 1, wherein the location of the first device is determined via time difference of arrival (TDOA) Bluetooth Low Energy (BLE) trilateration, wherein prior to determining the location of the first device, a determination is made whether the first device is within positioning range, the determination comprising:
determining that the first device is within BLE range of at least three BLE enabled sensors of the VR system.

6. The method of claim 1, wherein the first device identifier is a media access control (MAC) address associated with the first device.

7. A computer program product comprising a non-transitory computer readable storage medium having program instructions embodied therewith, the program instructions executable by a processor to cause the processor to perform a method comprising:
determining a virtual reality (VR) boundary associated with a VR system, the VR boundary being a perimeter set at a fixed location defining a safe play area for a VR user using the VR system based on surrounding objects outside of the VR boundary;
determining, in response to determining the VR boundary, a location of a first device using an indoor positioning system;
determining that the location of the first device has entered the VR boundary while the VR user wearing a VR head-mounted display (HMD) of the VR system is currently viewing VR content output on the VR HMD;
alerting, in response to determining that the location of the first device has entered the VR boundary, the VR user by displaying an indication that the first device entered the VR boundary on the VR HMD;
alerting, in response to determining that the location of the first device has entered the VR boundary, a non-user associated with the first device by displaying an indication that the first device entered the VR boundary on the first device; and
overlaying a first image on the location of the first device on a display of the VR HMD, the first image assigned to the first device using a first device identifier.

8. The computer program product of claim 7, wherein the VR boundary is collected from a software program associated with the VR system, wherein the VR boundary is configured via a room-set up protocol on the software program.

9. The computer program product of claim 7, wherein the location of the first device is determined via received signal strength indication (RSSI) analysis, wherein RSSI analysis comprises:
measuring an RSSI value of the first device with respect to a first signal source;
determining, based on a transmitted power of the first signal source and the RSSI value of the first device, a propagation loss of a signal of the first signal source; and
inferring, using a propagation loss model, a distance between the first device and the first signal source.

10. The computer program product of claim 9, wherein prior to determining the location of the first device, a determination is made whether the first device is within positioning range, wherein if the RSSI value of the first device is non-zero, a determination is made that the first device is within positioning range.

11. The computer program product of claim 7, wherein the method further comprises:
pausing, prior to alerting the VR user that the first device entered the VR boundary, use of the VR system in response to determining that the location of the first device is within the VR boundary.

12. The computer program product of claim 7, wherein the method further comprises:
determining that a second location of a second device has entered the VR boundary while the VR user wearing the VR head-mounted display (HMD) of the VR system is currently viewing VR content output on the VR HMD;
overlaying a second image at the second location of the second device on the display of the VR head mounted display (HMD), the second image assigned to the second device using a second device identifier;
alerting, in response to determining that the second location of the second device has entered the VR boundary, a second non-user associated with the second device by displaying an indication that the second device entered the VR boundary on the second device; and
alerting, in response to determining that the second location of the second device has entered the VR boundary, the non-user associated with the first device by displaying an indication that the second device entered the VR boundary on the first device.

13. The computer program product of claim 7, wherein alerting the VR user with an indication that the first device entered the VR boundary includes:
issuing an audio warning to the VR user warning the VR user of the first device; and
presenting a visual warning to the VR user warning the VR user of the first device.

14. A system comprising:
a virtual reality (VR) head-mounted display (HMD);
at least two VR sensors; and
a computer system communicatively coupled to the VR HMD and the at least two VR sensors, the computer system including at least one memory component and at least one processor, the processor being configured to perform a method comprising:
determining a virtual reality (VR) boundary associated with the VR HMD, the VR boundary defining a safe play area for a VR user using the VR HMD;
determining, in response to determining the VR boundary, that a first device is within a time difference of arrival (TDOA) wireless trilateration positioning range;
determining, in response to determining that the first device is within the TDOA wireless trilateration positioning range, a location of the first device using TDOA wireless trilateration;
determining that the location of the first device has entered the VR boundary while the VR user is wearing the VR HMD viewing VR content output on the VR HMD;
pausing, in response to determining that the location of the first device has entered the VR boundary, use of the VR HMD;
alerting, in response to determining that the location of the first device has entered the VR boundary, a non-user associated with the first device by displaying an indication that the first device entered the VR boundary on the first device; and overlaying a first image on the location of the first device on a display of the VR HMD, the first image assigned to the first device using a first device identifier.

15. The system of claim 14, wherein determining that the first device is within the TDOA wireless trilateration positioning range includes:

determining that the first device is within Bluetooth Low Energy (BLE) range of the at least two VR sensors, the at least two VR sensors being BLE enabled sensors.

16. The system of claim 14, where the first image is defined by the non-user associated with the first device.

17. The system of claim 14, wherein the method performed by the processor further comprises:

determining a second location of a second device;

determining that the second location of the second device is within the VR boundary; and overlaying a second image on the second location of the second device on the display of the VR head mounted display (HMD), the second image defined by a second user associated with the second device and assigned to the second device via a media access control (MAC) address of the second device.

18. The system of claim 14, wherein the method performed by the processor further comprises:

issuing an audio warning to the VR HMD warning the VR user of the first device.

19. The system of claim 14, wherein the TDOA wireless trilateration is Wi-Fi based TDOA wireless trilateration.

* * * * *